(12) United States Patent
Swanson et al.

(10) Patent No.: US 7,156,889 B1
(45) Date of Patent: Jan. 2, 2007

(54) ASSEMBLY FOR REMOVING DUST FROM GAS STREAM

(75) Inventors: Malcolm Swanson, Chickamauga, GA (US); Andrew Hobbs, Sheffield (GB)

(73) Assignee: Astec, Inc., Chattanooga, TN (US)

( * ) Notice: Subject to any disclaimer, the term of this patent is extended or adjusted under 35 U.S.C. 154(b) by 358 days.

(21) Appl. No.: 10/885,198

(22) Filed: Jul. 6, 2004

Related U.S. Application Data

(60) Provisional application No. 60/487,481, filed on Jul. 15, 2003.

(51) Int. Cl.
*B01D 45/12* (2006.01)
*B01D 50/00* (2006.01)

(52) U.S. Cl. .................. 55/337; 55/341.1; 55/356; 55/396; 55/457; 55/467

(58) Field of Classification Search .............. 55/337, 55/341.1, 356, 396, 457, 461
See application file for complete search history.

(56) References Cited

U.S. PATENT DOCUMENTS

| | | | |
|---|---|---|---|
| 1,360,349 A | 11/1920 | Wright | |
| 2,960,184 A | 11/1960 | Deitlhauser | |
| 3,448,563 A | 6/1969 | Sobeck | |
| 3,842,461 A | 10/1974 | Wurster | |
| 3,870,489 A | 3/1975 | Shaddock | |
| 4,017,281 A | 4/1977 | Johnstone | |
| 4,141,705 A | 2/1979 | Campolong | |
| D255,355 S | 6/1980 | Mize et al. | |
| 4,323,377 A | 4/1982 | Jolin | |
| 4,336,041 A | 6/1982 | Jolin | |
| 4,844,665 A | 7/1989 | Howell | |
| 4,951,417 A | 8/1990 | Gerken et al. | |
| 4,985,058 A | 1/1991 | Prinsloo et al. | |
| 5,030,259 A | 7/1991 | Bryant et al. | |
| 5,141,528 A | 8/1992 | Boczkiewicz et al. | |
| 5,199,354 A | 4/1993 | Wood | |
| 5,351,630 A | 10/1994 | Lister et al. | |
| 5,457,271 A | 10/1995 | Aulson | |
| 5,498,273 A | 3/1996 | Mann | |
| 6,152,308 A | 11/2000 | Kreiser et al. | |
| 6,280,502 B1 | 8/2001 | van Veen et al. | |
| 6,331,195 B1 | 12/2001 | Faust et al. | |
| 2002/0088347 A1 | 7/2002 | Kinsel | |
| 2003/0015095 A1 | 1/2003 | Brashears | |
| 2003/0080224 A1 | 5/2003 | Rowley, Jr. | |

FOREIGN PATENT DOCUMENTS

JP        09299732 A   *  11/1997

* cited by examiner

*Primary Examiner*—Robert A. Hopkins
(74) *Attorney, Agent, or Firm*—Chambliss, Bahner & Stophel, P.C.

(57) ABSTRACT

A dust collection assembly includes a primary collection assembly and a secondary collection assembly and may be connected to a source of gas having dust entrained therein. The primary collection assembly includes a primary duct having an inlet end and an outlet end. A first apparatus is mounted within the primary duct imparts a swirling motion to the gas which enters through the inlet end of the duct. A second apparatus is located downstream of the first apparatus for removing a portion of the dust entrained in the gas. The secondary collection assembly is in fluid communication with the outlet end of the primary collection assembly, and it includes a plurality of filter bags. The dust collection assembly also includes a fan that is in fluid communication with the secondary collection assembly.

20 Claims, 5 Drawing Sheets

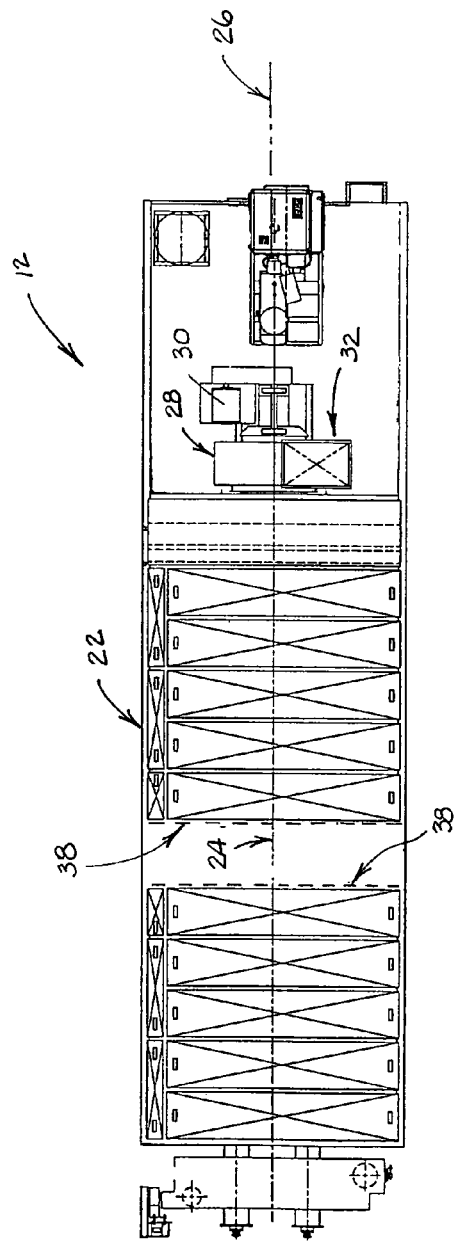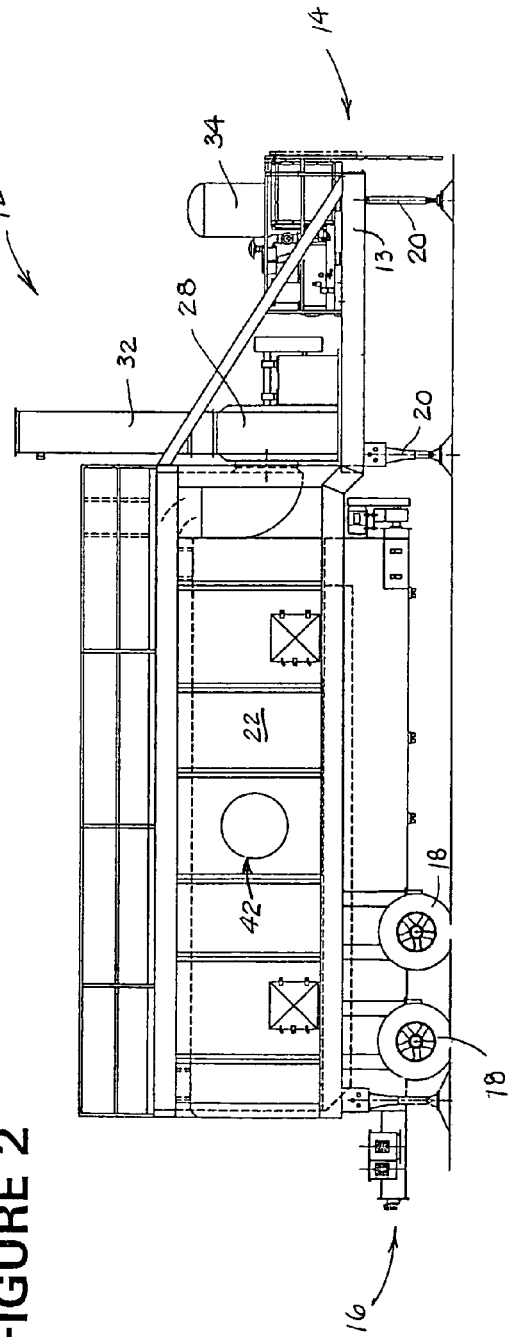
FIGURE 2
FIGURE 1

ASSEMBLY FOR REMOVING DUST FROM GAS STREAM

CROSS REFERENCE TO RELATED APPLICATION

This application claims the benefit of U.S. Provisional Application No. 60/487,481, which was filed on Jul. 15, 2003.

FIELD OF THE INVENTION

This invention relates generally to an assembly for removing dust from a gas stream such as an air stream. More particularly, the invention relates to a two-stage dust collection assembly which includes a primary stage dust collection assembly and a filter-based secondary stage collection assembly such as a baghouse.

BACKGROUND AND DESCRIPTION OF THE PRIOR ART

Asphalt plants typically include a rotating aggregate drier in which aggregate materials are heated and dried before being mixed with asphalt cement, an asphalt cement supply system, and a mixing tower or chamber where the aggregate materials and asphalt cement are mixed together. The drier of this arrangement is typically oriented so as to have an upper end and a lower end, so that aggregate that is introduced into the drier at the upper end will move towards the lower end by gravity flow and by the action of a series of flights mounted on the interior surface of the rotating drier. A burner is located at the lower end of the drier, and the hot air and exhaust gases from the burner move toward the upper end of the drier, against the flow of the aggregate materials. As the aggregate materials are tumbled through the exhaust gases, the materials are heated and dried. The hot, dry aggregate materials are discharged from the drier at the lower end and introduced to a mixing tower or chamber where these materials are combined with asphalt cement. As the aggregate materials are tumbled and dried in the drier, a quantity of dust is typically created and carried upwardly by the hot gases of combustion. Because of particulate emission regulations, it is unacceptable to exhaust the dust to the atmosphere. Furthermore, depending on the speed of rotation and the temperature at which the drier is operated, the quantity of dust may represent a significant portion of the fine aggregate material needed in the particular asphalt mix. Therefore, dust collection or recovery systems are known for removal of the dust from the gas stream before further processing of the combustion gases and/or exhaustion to the atmosphere. The dust which is collected in the dust recovery system may then be introduced to the mixing tower or chamber for inclusion in the asphalt mix.

It is known to provide a dust recovery system which includes an inertially driven primary collector such as a cyclone and a filter-based secondary collector such as a baghouse. In such a system, the primary collector will operate to remove the larger sized particles (i.e. larger than about 150 microns) and the secondary collector will remove the remaining particles. It is also known to provide a portable baghouse for use in connection with an asphalt plant. However, for maximum efficiency, a baghouse should be combined with an inertially driven primary collector such as a cyclone. Nevertheless, adding a cyclone to a portable baghouse assembly requires the addition of a fairly large component to a system where space is at a premium. It also requires the addition of ductwork between the primary collector and the baghouse and some provision for connecting the primary collector to a drier.

It would be desirable, therefore, if a simpler primary collector could be combined with a baghouse. It would also be desirable if such primary collector could incorporate or include a conduit for connection to a drier. Furthermore, it would be desirable if such a primary collector were capable of being stored in the enclosure of the baghouse.

ADVANTAGES OF THE INVENTION

Among the advantages of the invention is that it provides a dust collection assembly which includes a primary collection assembly and a filter-based secondary collection assembly. An advantage of a preferred embodiment of the invention is that it provides a primary collection assembly that incorporates or includes a conduit for connection to a drier. Another advantage of a preferred embodiment of the invention is that it provides a primary collection assembly that is self-storing within the enclosure of the secondary collection assembly.

Additional advantages of the invention will become apparent from an examination of the drawings and the ensuing description.

EXPLANATION OF TECHNICAL TERMS

As used herein, the term "dust" refers to particulate material that may be entrained in a gas.

As used herein, the term "swirling motion" refers to flow of a gas within a duct, which flow includes a component that is directed radially outwardly.

As used herein, the terms "blade", "blade assembly" and similar terms refer to an apparatus or structure that imparts a swirling motion to a gas flowing by or across it.

SUMMARY OF THE INVENTION

The invention comprises a dust collection assembly that may be connected to a source of gas having dust entrained therein. The dust collection assembly comprises a primary collection assembly and a secondary collection assembly. The primary collection assembly includes a primary duct having an inlet end, an outlet end and a first means mounted within the primary duct near the inlet end for imparting a swirling motion to the gas which enters through the inlet end of the primary duct. The primary collection assembly also includes a second means located downstream from the first means for removing a portion of the dust entrained in the gas. The secondary collection assembly is in fluid communication with the outlet end of the primary collection assembly, and it includes a plurality of filter bags. The dust collection assembly also includes a fan that is in fluid communication with the secondary collection assembly.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 1 illustrates a side view of a preferred embodiment of the secondary collection assembly of the invention.

FIG. 2 illustrates a top, partial sectional view of the embodiment of FIG. 1.

DESCRIPTION OF THE PREFERRED EMBODIMENTS OF THE INVENTION

Figure 3:
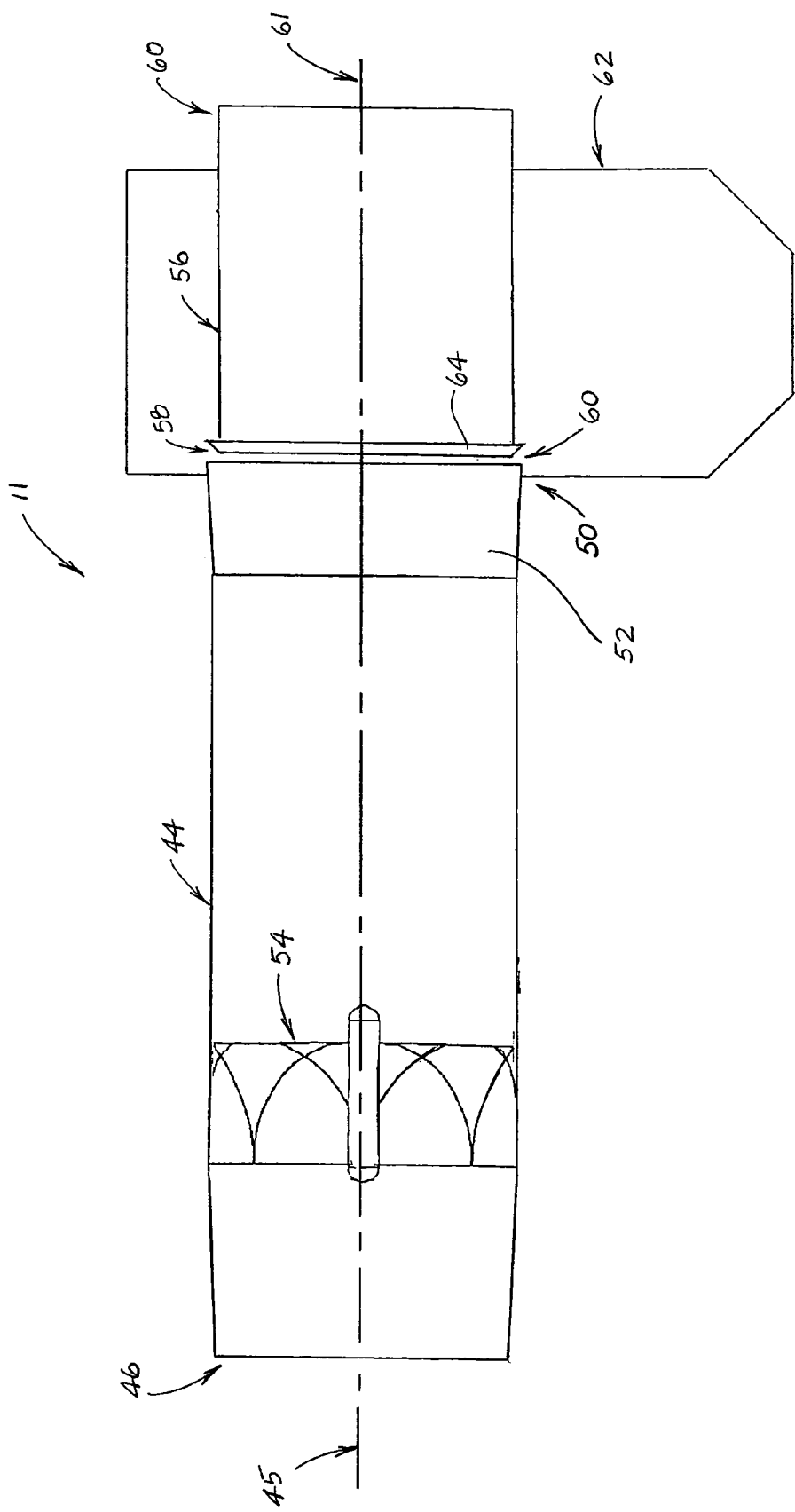
FIG. 3 illustrates a sectional view of a preferred embodiment of the primary collection assembly of the invention.

Referring now to the drawings, the invention comprises a dust collection assembly that may be connected to a source of gas having dust entrained therein, such as an aggregate drier that may be associated with an asphalt production plant. As shown in the drawings, preferred dust collection assembly 10 (see FIGS. 7–9) comprises a primary collection assembly 11 (not shown in FIGS. 1 and 2) and a secondary collection assembly 12 which includes a plurality of filter bags (also not shown in FIGS. 1 and 2). Assembly 10 is mounted on a trailer that is adapted to be pulled by a highway tractor (not shown), and includes trailer frame 13 having front end 14 and rear end 16. A plurality of wheels 18 are located near rear end 16, and a plurality of ground supports 20 that are adapted to support the trailer in its operating configuration are also provided. Attached to and mounted on the trailer is an enclosure 22, which has a generally rectangular cross-section and a long axis 24 that is generally parallel to long axis 26 of the trailer. Enclosure 22 and its filter bags 27 (shown in FIG. 9) comprise preferred secondary collection assembly 12, which may be referred to herein as a baghouse. Also mounted on the trailer is fan 28 that is operatively connected to and in fluid communication with the secondary collection assembly (or baghouse), drive motor 30 (see FIG. 2) for the fan and an exhaust port or stack 32 that is operatively connected to and in fluid communication with the baghouse. A compressor 34 (best shown in FIG. 1) may also be mounted on the trailer for use in connection with a pulse-type filter bag cleaning system such as is known to those having ordinary skill in the art to which the invention relates.

The preferred baghouse contains a plurality of filter bags 27 (shown in FIG. 9) suspended therein on either side of curtain walls 38 (see FIGS. 2 and 7–9) which extend downwardly to terminal end 40 (see FIGS. 7 and 8) just below the bottom of the bags. Preferred primary collector assembly 11 (shown in FIGS. 3 and 7–9) extends through air inlet port 42 (FIG. 1) that is preferably located in the side of the baghouse so that a gas entraining dust to be treated according to the invention enters the baghouse from a direction that is generally perpendicular to the long axis of the baghouse.

As shown in FIG. 3, preferred primary collecting assembly 11 includes primary duct 44 having longitudinal axis 45. Inlet end 46 of the primary duct is adapted to be attached to the exhaust outlet 47 of an aggregate drier such as drier 48 (shown in FIG. 9). A coupling tube 49 (also shown in FIG. 9) may be interposed between the primary duct and the exhaust outlet of the drier. The primary duct also has an outlet end 50 opposite inlet end 46, which preferably includes flanged section 52 that flares outwardly so that outlet end 50 has a slightly larger diameter than inlet end 46. Although it is preferred that the primary duct be in the form of a cylindrical tube, other cross-sectional shapes are also contemplated within the scope of the invention, and in such event, it is preferred that outlet end 50 has a slightly larger cross-sectional dimension than does inlet end 46.

Figure 5:
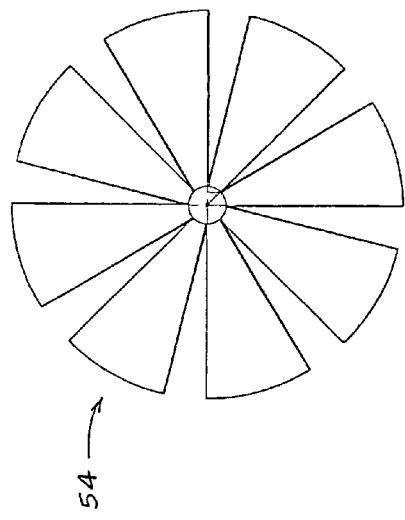
FIG. 5 illustrates an end view of the blades of FIG. 4.
Figure 4:
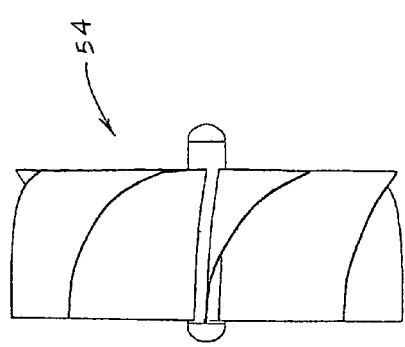
FIG. 4 illustrates a side view of the blades of the preferred primary collection assembly of the invention.
Figure 6:
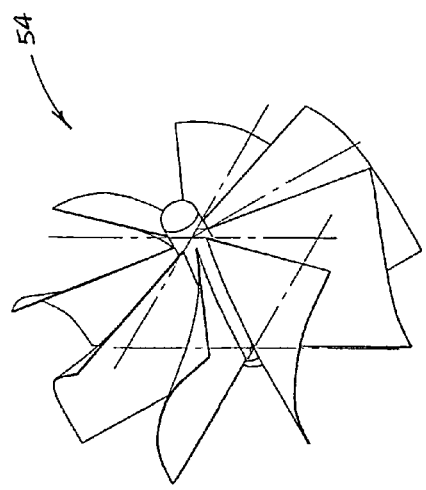
FIG. 6 illustrates a perspective view of the blades of FIGS. 4 and 5.

Mounted in the primary duct near inlet end 46 is stationary fan blade assembly 54 or other means for imparting a swirling motion to the gas which enters through inlet end 46 (flowing from left to right as shown in FIG. 3). FIGS. 4, 5 and 6 illustrate a side view, end view and perspective view of preferred blade assembly 54. Referring again to FIG. 3, primary collection assembly 11 preferably includes vortex tube 56 having inlet end 58, outlet end 60 and longitudinal axis 61. Preferably, the vortex tube is mounted with respect to the primary duct so that longitudinal axis 61 of vortex tube 56 is substantially coaxial with longitudinal axis 45 of primary duct 44. Inlet end 58 of preferred vortex tube 56 is located adjacent to outlet end 50 of the primary duct. The outside diameter of vortex tube 56 (or the outside dimension, if the vortex tube is not cylindrical) at inlet end 58 is slightly smaller than the inside diameter (or dimension) of primary duct 44 at end 50 so that an annular gap 60 is formed between the outside of vortex tube 56 and the inside of primary duct 44 at end 50.

Figure 8:
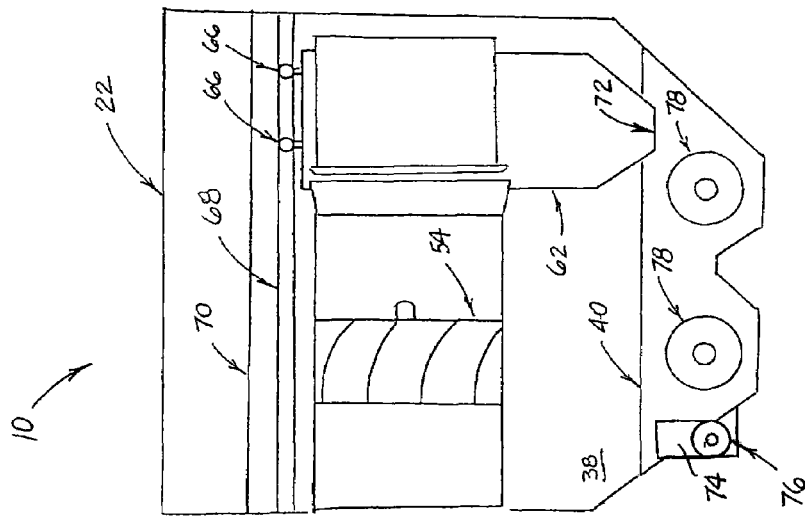
FIG. 8 illustrates a sectional side view of the embodiment of FIG. 7 showing the primary collection assembly in the retracted or transport configuration.
Figure 7:
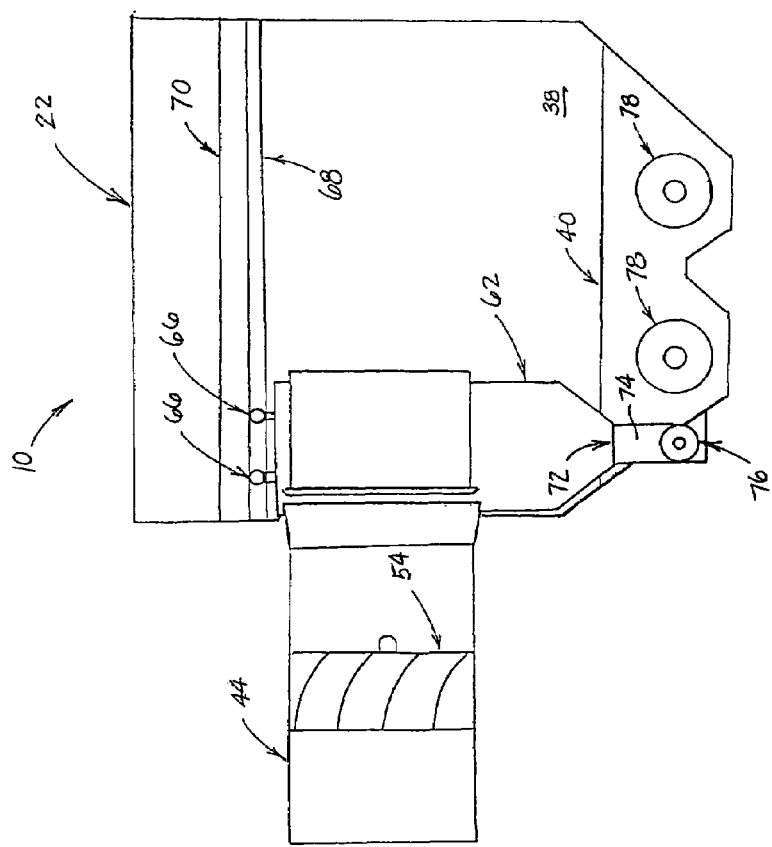
FIG. 7 illustrates a sectional side view of the preferred embodiment of the invention showing a preferred embodiment of the primary collection assembly of the dust collection assembly in the extended or operating configuration.
Figure 9:
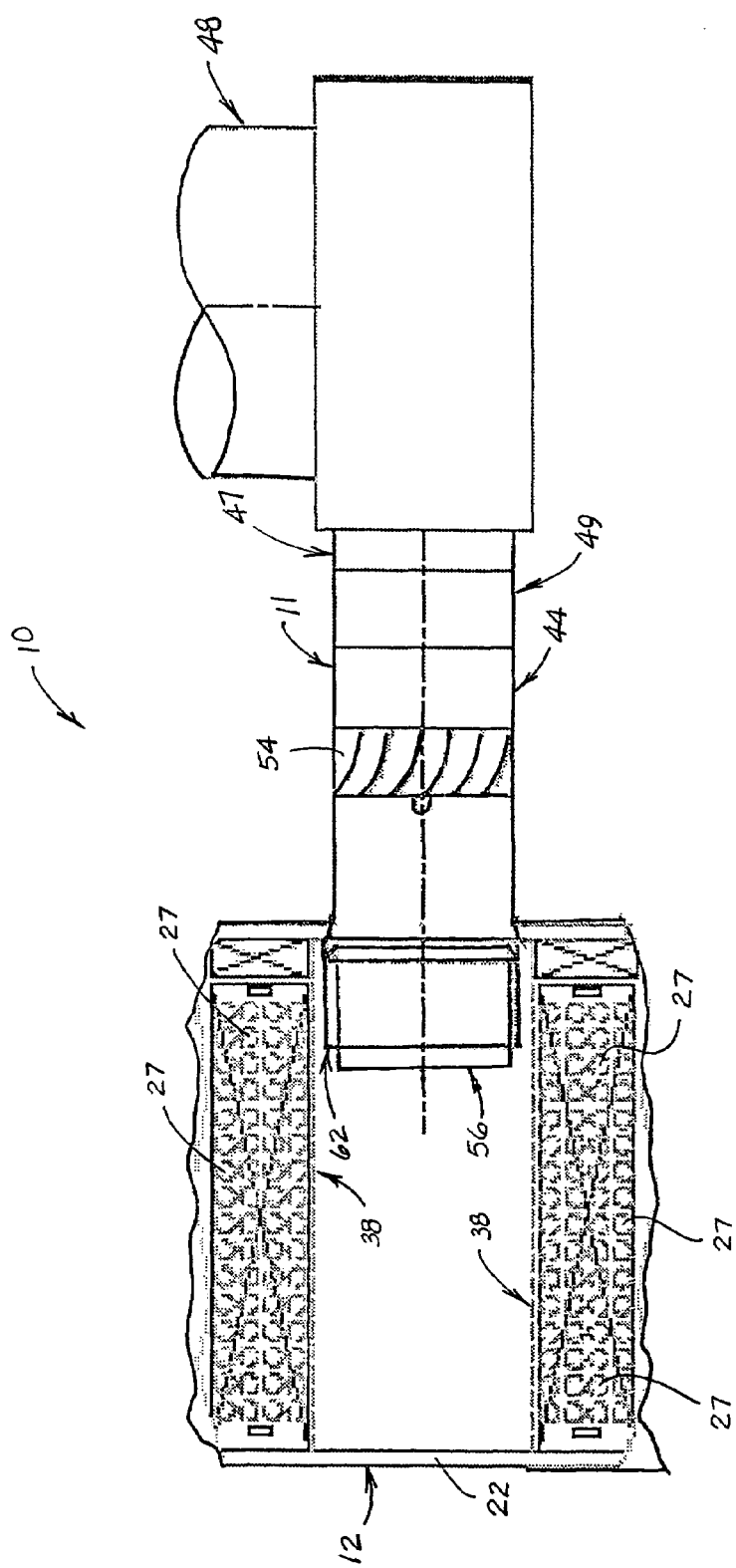
FIG. 9 illustrates a sectional top view of the preferred embodiment of the invention illustrated in FIG. 7, showing the connection of the primary collection assembly to a drum-type aggregate drier.

Collection box 62 is located around the annular gap at the junction of the primary duct and the vortex tube. An angled ring 64 is mounted so as to slide on the outside of the vortex tube adjacent to or within the annular gap. In the drawings, the angled ring is shown at inlet end 58 of vortex tube 56, although it is contemplated that it may slide to a position towards the right as shown in FIG. 3 to change the size of the annular gap and thereby affect the efficiency of the collecting assembly. Outlet end 60 of the vortex tube opens into the baghouse (as shown in FIGS. 7–9). Dust-laden air or other gas entering the primary collection assembly 11 from the aggregate drier or other source passes across blade assembly 54, which generates a swirling flow within the primary duct. Centrifugal forces acting on the dust particles in the flow cause the particles to move radially outwardly. At the annular gap between the primary duct and the vortex tube, the larger (or heavier) particles that are in the swirling flow adjacent to the walls of the primary duct will pass through the gap and into the collection box. The smaller particles will be carried by the air flow through the vortex tube and into the interior of the baghouse.

As best shown in FIGS. 7 and 8, primary collection assembly 11 is mounted so as to be extended out of the air inlet port for attachment to the exhaust outlet of an aggregate drier (FIG. 7) or retracted into the baghouse for transport (FIG. 8). In this embodiment of the invention, primary collection assembly 11 is mounted by to a carriage which is preferably comprised of a four rollers 66 (only two of which are shown) which are mounted in pairs to the top of the collection box on opposite sides. This carriage is adapted to travel back and forth across the width of the baghouse between curtain walls 38 (see FIGS. 2 and 9) on roller tracks 68 (only one of which is shown in FIGS. 7 and 8), which tracks are located just below the tube sheet 70 from which filter bags 27 are suspended in the portions of the baghouse outside of the curtain walls. In the embodiment of the invention illustrated in FIGS. 7 and 8, dust collected in the collection box may be directed through chute opening 72 into collecting chute 74. An auger 76 located in the bottom of the collecting chute may be employed to convey the dust that is collected in the collection box to a discharge port (not shown) for removal from the baghouse. In the alternative, the collecting chute may be omitted and the dust from the collection box discharged through chute opening 72 into the bottom of the baghouse. A pair of augers 78 located below the curtain walls in the bottom of the baghouse may be employed to convey dust that is collected on the filter bags (and dust that may be discharged into the bottom of the baghouse from the collection box) to a discharge port (not shown) for removal from the baghouse. Such dust may then be transferred to an asphalt mixer (not shown).

According to the preferred embodiment of the invention as shown and described herein, the primary collection assembly is oriented and arranged with respect to the secondary collection assembly so as to divide the enclosure into a left section, a right section and an intermediate section (shown in FIG. 2). In this embodiment of the invention, the primary collection assembly is mounted to or within the intermediate section of the enclosure, a portion of the secondary collection assembly is located in the left section of the enclosure, and a portion of the secondary collection assembly is located in the right section of the enclosure. However, other arrangements and configurations of the primary and secondary collection assemblies are contemplated within the scope of the invention. Furthermore, although this description contains many specifics, these should not be construed as limiting the scope of the invention but as merely providing illustrations of the presently preferred embodiment thereof, as well as the best mode contemplated by the inventors of carrying out the invention. The invention, as described herein, is susceptible to various modifications and adaptations as would be understood by those having ordinary skill in the art to which the invention relates, and the same are intended to be comprehended within the meaning and range of equivalents of the appended claims.

What is claimed is:

1. A dust collection assembly that may be connected to a source of gas having dust entrained therein, said dust collection assembly comprising:
    (A) a primary collection assembly comprising:
        (i) a primary duct having:
            (a) an inlet end;
            (c) an outlet end;
            (c) first means mounted within the primary duct near the inlet end for imparting a swirling motion to the gas which enters through the inlet end of the primary duct;
            (d) second means located downstream of the first means for removing a portion of the dust entrained in the swirling gas;
    (B) a secondary collection assembly which:
        (i) is in fluid communication with the outlet end of the primary collection assembly;
        (ii) includes a plurality of filter bags;
    (C) a fan that is in fluid communication with the secondary collection assembly.

2. The dust collection assembly of claim 1 wherein the primary collection assembly and the secondary collection assembly are mounted within an enclosure on a frame which comprises a trailer.

3. The dust collection assembly of claim 2:
    (A) wherein the frame has a longitudinal axis;
    (B) which includes a pair of curtain walls that are mounted within the enclosure, each of which lies generally within a plane that is substantially perpendicular to the longitudinal axis of the frame, said curtain walls dividing the enclosure into a left section, a right section and an intermediate section;
    (C) wherein the primary collection assembly is mounted to or within the intermediate section of the enclosure;
    (D) wherein a portion of the secondary collection assembly is located in the left section of the enclosure and a portion of the secondary collection assembly is located in the right section of the enclosure.

4. The dust collection assembly of claim 2:
    (A) which includes a track extending across the enclosure;
    (B) wherein the primary collection assembly is mounted so as to be moveable along the track between a first position in which the inlet end of the primary duct is outside of the enclosure and a second position in which the primary collection assembly is entirely within the enclosure.

5. A dust collection assembly comprising:
    (A) a primary collection assembly comprising:
        (i) a primary duct having:
            (a) a longitudinal axis;
            (b) an inlet end;
            (c) an outlet end having an internal diameter;
        (ii) a plurality of blades that are mounted within the primary duct near the inlet end;
        (iii) a vortex tube having:
            (a) a longitudinal axis;
            (b) an inlet end having with an outside diameter that is less than the internal diameter of the outlet end of the primary duct;
            (c) an outlet end;
            said vortex tube being mounted with its inlet end adjacent to the outlet end of the primary duct so as to form an annular gap between the inlet end of the vortex tube and the outlet end of the primary duct;
    (B) a secondary collection assembly that is in fluid communication with the outlet end of the vortex tube, which secondary collection assembly includes a plurality of filter bags;
    (C) a fan that is in fluid communication with the secondary collection assembly.

6. The dust collection assembly of claim 5 wherein the vortex tube is mounted with its longitudinal axis substantially coaxial with the longitudinal axis of the primary duct.

7. The dust collection assembly of claim 5 wherein the primary collection assembly includes a dust collection box that is located adjacent to the annular gap between the inlet end of the vortex tube and the outlet end of the primary duct, so that dust passing through the annular gap is retained in the dust collection box.

8. The dust collection assembly of claim 5 wherein the primary duct has an inside diameter at its inlet end that is smaller than the inside diameter at its outlet end.

9. The dust collection assembly of claim 5 which includes an angled ring that is located adjacent to or within the annular gap between the inlet end of the vortex tube and the outlet end of the primary duct.

10. The dust collection assembly of claim 9 wherein the location of the angled ring in the annular gap is adjustable.

11. The dust collection assembly of claim 5:
(A) wherein the primary collection assembly and the secondary collection assembly are mounted within an enclosure on a frame which comprises a trailer;
(B) which includes a track extending across the enclosure;
(C) wherein the primary collection assembly is mounted so as to be moveable along the track between a first position in which the inlet end of the primary duct is outside of the enclosure and a second position in which the primary collection assembly is entirely within the enclosure.

12. The dust collection assembly of claim 11 wherein:
(A) the primary collection assembly includes a dust collection box that is located adjacent to the annular gap between the inlet end of the vortex tube and the outlet end of the primary duct, so that dust passing through the annular gap is retained in the dust collection box;
(B) the dust collection box remains within the enclosure when the primary collection assembly is in the first position.

13. The dust collection assembly of claim 11 wherein the dust collection box includes an outlet through which dust collected therein may be discharged.

14. The dust collection assembly of claim 11:
(A) wherein the frame has a longitudinal axis;
(B) which includes a pair of curtain walls that are mounted within the enclosure, each of which lies generally within a plane that is substantially perpendicular to the longitudinal axis of the frame, said curtain walls dividing the enclosure into a left section, a right section and an intermediate section;
(C) wherein the primary collection assembly is mounted to or within the intermediate section of the enclosure;
(D) wherein a portion of the secondary collection assembly is located in the left section of the enclosure and a portion of the secondary collection assembly is located in the right section of the enclosure.

15. A dust collection assembly comprising:
(A) a frame having a longitudinal axis;
(B) an enclosure mounted on the frame;
(C) a pair of curtain walls that are mounted within the enclosure, each of which lies generally within a plane that is substantially perpendicular to the longitudinal axis of the frame, said curtain walls dividing the enclosure into a left section, a right section and an intermediate section;
(D) a primary collection assembly that is mounted to or within the intermediate section of the enclosure, said primary collection assembly comprising:
   (i) a primary duct having:
      (a) a longitudinal axis;
      (b) an inlet end;
      (c) an outlet end having an internal diameter;
   (ii) a stationary fan blade assembly that is mounted within the primary duct near the inlet end, said blade assembly being arranged to impart a swirling motion to air entering the inlet end of the primary duct;
   (iii) a vortex tube having:
      (a) a longitudinal axis;
      (b) an inlet end having an outside diameter that is less than the internal diameter of the outlet end of the primary duct;
      (c) an outlet end;
      said vortex tube being mounted with its longitudinal axis substantially coaxial with the longitudinal axis of the primary duct and with its inlet end overlying the outlet end of the primary duct so as to form an annular gap between the inlet end of the vortex tube and the outlet end of the primary duct;
(F) a secondary collection assembly, a portion of which is located in the left section of the enclosure and a portion of which is located in the right section of the enclosure, which secondary collection assembly:
   (i) is in fluid communication with the outlet end of the vortex tube;
   (ii) includes a plurality of filter bags;
(G) a fan that is:
   (i) mounted on the frame;
   (ii) in fluid communication with the secondary collection assembly.

16. The dust collection assembly of claim 15 wherein the primary collection assembly includes a dust collection box that is located adjacent to the annular gap between the inlet end of the vortex tube and the outlet end of the primary duct, so that dust passing through the annular gap is retained in the dust collection box.

17. The dust collection assembly of claim 15 which includes an angled ring that is located adjacent to or in the annular gap between the inlet end of the vortex tube and the outlet end of the primary duct.

18. The dust collection assembly of claim 15:
(A) which includes a track extending across the enclosure in a direction that is substantially perpendicular to the longitudinal axis of the frame;
(B) wherein the enclosure includes an opening;
(C) wherein the primary collection assembly is mounted on a carriage that is moveable along the track between a first position in which the inlet end of the primary duct extends through the opening in the enclosure and a second position in which the primary collection assembly is entirely within the enclosure.

19. The dust collection assembly of claim 18 wherein:
(A) the primary collection assembly includes a dust collection box that is located adjacent to the annular gap between the inlet end of the vortex tube and the outlet end of the primary duct, so that dust passing through the annular gap is retained in the dust collection box;
(B) the dust collection box:
   (i) remains within the enclosure when the primary collection assembly is in the first position;
   (ii) includes an outlet through which dust collected therein may be discharged.

20. The dust collection assembly of claim 18 wherein:
(A) the primary collection assembly includes a dust collection box that is located adjacent to the annular gap between the inlet end of the vortex tube and the outlet end of the primary duct, so that dust passing through the annular gap is retained in the dust collection box;
(B) the dust collection box:
   (i) remains within the enclosure when the primary collection assembly is in the first position;
   (ii) includes an outlet through which dust collected therein may be discharged;
   (iii) includes a chute that is in communication with the outlet and which directs dust out of the dust collection box.

* * * * *